Dec. 4, 1928.
D. G. LORRAINE
1,693,849
OIL AND GAS SEPARATOR
Original Filed Nov. 6, 1922
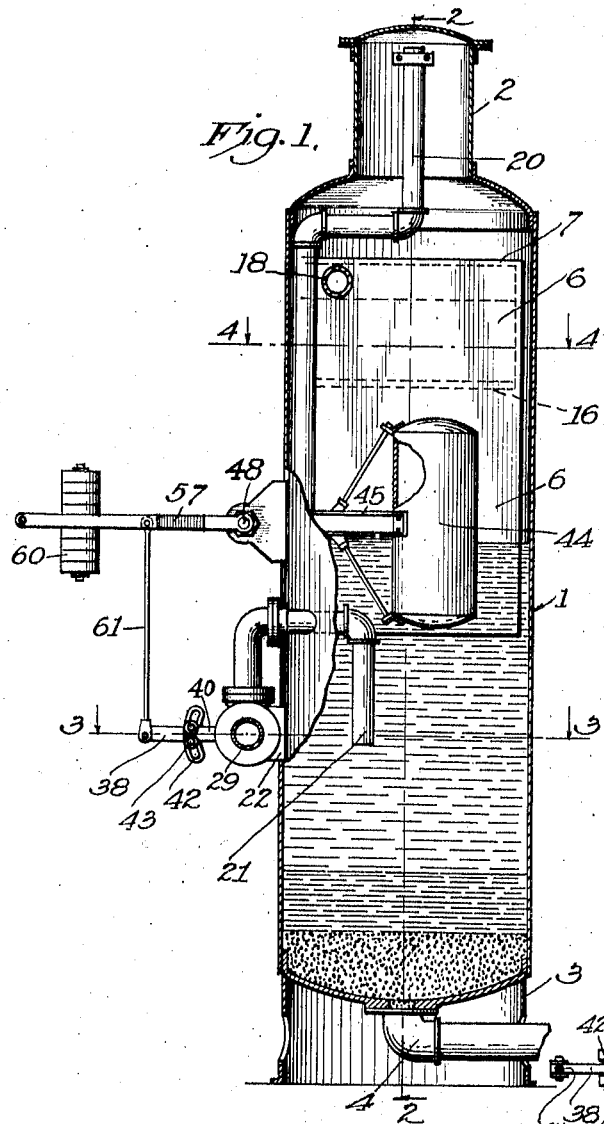
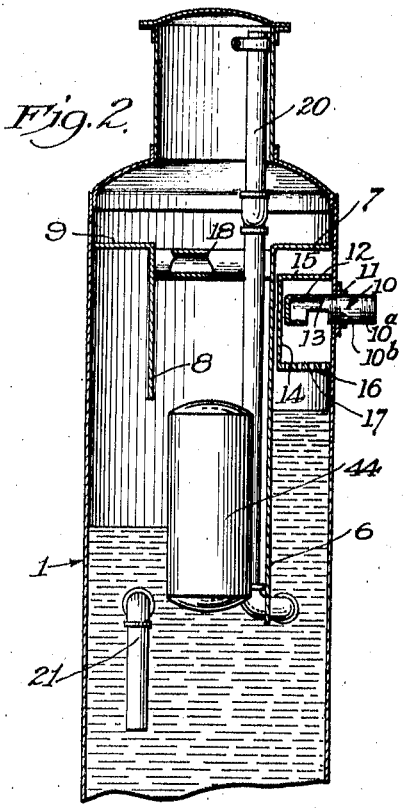
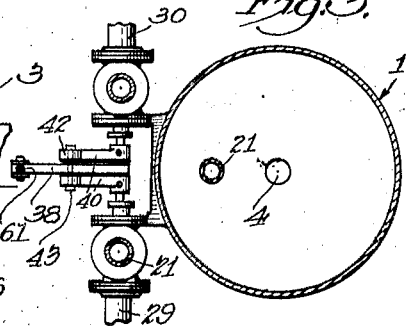
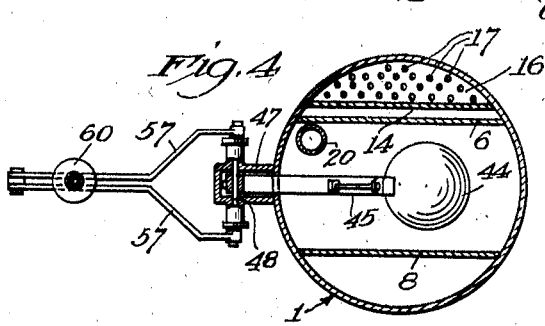
INVENTOR.
David G. Lorraine
BY
R. U. Smith
ATTORNEY.

Patented Dec. 4, 1928.

1,693,849

UNITED STATES PATENT OFFICE.

DAVID G. LORRAINE, OF LOS ANGELES, CALIFORNIA.

OIL AND GAS SEPARATOR.

Original application filed November 6, 1922, Serial No. 599,420. Divided and this application filed September 29, 1924. Serial No. 740,610.

This invention is an oil and gas separator, the present application being a division of my co-pending application Serial No. 599,420, filed Nov. 6, 1922, for oil and gas separators, now Patent 1,533,744, dated April 14, 1925.

It is the object of this invention to provide a separator having means for collecting the heavier constituents of the flow in a settling chamber where the sand and water will gravitate from the oil, and the gas will rise into a gas chamber; and to also provide means for collecting the lighter gas which rises from the flow before it reaches the settling chamber, in a scrubbing or cleaning chamber where any oil remaining mixed with said gas will gravitate to the settling chamber while the dry gas enters the gas chamber.

It is a further object of the invention to provide means whereby the entire flow passes through a perforated partition before entering either the settling, cleaning, or gas chamber, in order to break up the flow for ready separation of the constituents thereof, and to also decrease the velocity of the flow so that it will enter the settling chamber without causing a churning action.

It is a still further object of the invention to provide a flow inlet for the separator arranged whereby the force of the incoming flow is not directed against the walls of the separator with the resulting cutting through of said walls, the flow being directed into the settling chamber without movement thereof down the side walls of the tank.

The invention will be readily understood from the following description of the accompanying drawings, in which:

Fig. 1 is a vertical section through a separator constructed in accordance with the invention.

Fig. 2 is a vertical section on the line 2—2 of Fig. 1, the float being shown in elevation.

Figs. 3 and 4 are transverse sections on the lines 3—3 and 4—4 of Fig. 1.

The separator is illustrated as comprising a closed casing 1 having the dome 2 at the top thereof and open to said casing. The casing is preferably supported upon a base 3, and a sand discharge 4 is provided at the bottom of the casing.

A transverse vertical partition 6 is arranged in the upper portion of the casing at one side thereof, the sides of said partition meeting the side wall of the casing to form a space separated by said partition from the main portion of the casing. This space is closed at its top by a horizontal partition 7 extending from partition 6 to the casing wall. The partition 6 extends downwardly to about midway of the height of the casing, and the side space formed by the partition is open to the main portion of the casing below said partition.

A second transverse vertical partition 8 is arranged in the upper portion of the casing parallel to partition 6 and at the opposite side of the casing, the sides of this partition also meeting the side wall of the casing to form a space behind said partition and separated thereby from the main portion of the casing.

This space is closed at its top by a horizontal partition 9 extending from partition 8 to the casing wall, and the parts are so arranged that the upper portions of the opposite side spaces formed in the casing are in horizontal alinement. The lower edge of partition 8 terminates short of the lower edge of partition 6 a substantial distance, and the side space in back of partition 8 is open to the main portion of the casing below said partition.

The space in back of partition 6 is an inlet passageway for the flow from an oil well. As an instance of this arrangement a pipe 10 extends through the casing wall and into said side space near the top thereof. The pipe has a threaded end 10ª for connecting the same to the pipe line from a well, and also has an intermediate threaded portion 10ᵇ adapted to be screwed into a threaded port 11 in the side of the casing, for removably fixing the pipe in position in order that it may be conveniently replaced when worn.

The portion of pipe 10 extending into the side space of the casing is horizontally disposed and has a closed end 12. A lateral opening 13 is provided in the underside of said portion of the pipe in spaced relation from the end 12, so that oil will collect in the closed end of the pipe beyond the lateral opening to form a cushion for the flow through the pipe.

A casing encloses the end of pipe 10 which projects into the flow inlet passageway formed by partition 6. This casing comprises a transverse vertical wall 14 in the inlet passageway parallel to partition 6 and spaced therefrom, with said wall extending across the end of pipe 10 and having its side edges connected to the wall of casing 1. A top wall 15 connects wall 14 and the side of casing 1 above pipe 10 and below partition 7; and in similar manner a bottom wall 16 connects wall 14 and the side of the main casing below pipe 10. The wall 16 is perforated as shown at 17, throughout its area.

By the construction as thus described it will be seen that the force of the flow through pipe 10 is expended against the cushion in the end of said pipe and against the end wall thereof, said flow gravitating through opening 13, and all of said flow passing through the perforations 17 which will further retard said flow and also break up the same.

The heavier constituents of the flow then fall directly through the passageway formed by partition 6, and without impingement of said flow against the wall of casing 1 or the partition 6. As a consequence the flow will not cut out the wall or partition of the main casing, and should said flow cut out the end of pipe 10, the latter may be readily replaced, and the flow will still be diverted through perforations 17, by the wall 14 of the casing enclosing the inlet pipe.

A pipe 18 connects partitions 6 and 8 at their upper portions and opens into the side spaces in rear of said partitions; and the lighter gas which immediately separates from the heavier constituents of the flow in the inlet passageway formed by partition 6, will rise between said partition and the wall 14, and pass thence through pipe 18 into the upper portion of the side space in back of partition 8, and which is a scrubbing or cleaning chamber.

The lower portion of casing 1 forms a settling chamber receiving the flow from the inlet passageway, and in said settling chamber the heavier sand and water will sink below the oil, while dry gas will rise from the oil into the upper portion of casing 1 and into dome 2. The flow of gas through pipe 18 into the cleaning chamber formed by partition 8, will force said gas downwardly around the lower edge of said partition so that any oil remaining mixed with the gas will be liberated and gravitate to the settling chamber. As a consequence only dry gas is collected in dome 2, while the oil is collected in the lower portion of casing 1, with sand and water below said oil where they may be withdrawn through pipe 4.

Discharge pipes 20—21 communicate with the gas and oil chambers respectively, and valves are provided for said pipes and are connected to gas and oil lines 30 and 29. Operating arms 40 are provided for the respective valves, and are adjustably connected to an actuating arm 38 by providing arcuate slots 42 in the operating arms, with bolts 43 received through said slots and the actuating arm 38.

Movement of arm 38 for opening or closing the valves so as to regulate the discharge of gas and oil from the separator, is controlled by a float 44 mounted in the main portion of casing 1 at the lower part of partition 6. The float is provided with a supporting arm 45 which extends outwardly through the wall of casing 1 into a bearing shell 47, and is fixed to a shaft 48 journaled in said shell and projecting beyond the sides thereof.

Arms 57 are fixed upon the ends of shaft 48, and a counter-weight 60 is mounted on said arms, with a link 61 connecting said arms and the actuating arm 38. It will thus be seen that rise and fall of float 44 responsive to variations in the liquid level in casing 1, will actuate arm 38 so as to control the opening and closing of valves.

It will be apparent that various changes may be made in the construction, combination, and arrangement of parts as thus described, without departing from the spirit of the invention.

I claim:

1. A device of the character described comprising a settling chamber, a gas chamber open to said settling chamber, a cleaning chamber communicating with said gas chamber at its lower end, a flow inlet above said settling chamber, and means above said settling chamber between said flow inlet and said settling chamber and gas chamber adapted to break up all of said flow in its passage to said settling chamber or gas chamber.

2. A device of the character described comprising a settling chamber, a gas chamber open to said settling chamber, a cleaning chamber above said settling chamber and open at its discharge end to said gas chamber, a flow inlet open to said settling chamber, and a conduit from said flow inlet to said cleaning chamber.

3. A device of the character described including a settling chamber having vertical walls, a perforated horizontal partition above said settling chamber, a gas chamber open to said settling chamber arranged for unobstructed flow from said settling chamber to said gas chamber at the side of said partition, and a flow inlet discharging vertically upon said partition for passage of said flow through said perforations and to said settling chamber without impingement of said flow against the side walls of said chamber.

4. A device of the character described comprising a settling chamber having a flow inlet, a gas chamber open to said settling chamber, a cleaning chamber, and a conduit from said flow inlet to said cleaning chamber.

5. A device of the character described comprising a tank having a vertical partition terminating short of the bottom of said tank and forming a space at the side of the tank closed to the main portion thereof at the top of said partition and open to said main portion of the tank below said partition, a flow inlet in said side space, a second partition in said tank terminating short of the bottom of said first partition and forming a space at the opposite side of the tank closed to the main portion thereof at the top of said partition and open to the main portion of the tank at the bottom of said second partition, and a conduit connecting said partitions at the top thereof and opening into said side spaces, the upper and lower parts of the main portion of the tank forming a gas chamber and a settling chamber respectively.

6. A device of the character described comprising a tank having a vertical partition terminating short of the bottom of said tank and forming a space at the side of the tank closed to the main portion thereof at the top of said partition and open to said main portion of the tank below said partition, a flow inlet in said side space, a casing enclosing said flow inlet and spaced from said partition, said casing having a perforated base whereby all of said flow is adapted to pass through said perforations and into said side space, a second partition in said tank terminating short of the bottom of said first partition and forming a space at the opposite side of the tank closed to the main portion thereof at the top of said partition and open to the main portion of the tank below said partition, and a conduit connecting the partitions in the tank at the top thereof and opening into said side spaces, the upper and lower parts of the main portion of the tank forming a gas chamber and a settling chamber respectively.

7. A device of the character described comprising a tank having a vertical partition terminating short of the bottom of said tank and forming a space at the side of the tank which is open to the main portion thereof below said partition, a horizontally disposed flow inlet pipe in said side space having a closed end and a lateral discharge, and guide means for said flow below said discharge and arranged whereby said flow is directed vertically into the main portion of the tank and without impingement thereof against the walls of the tank or said partition below said guide means, the upper and lower parts of the main portion of the tank forming a gas chamber and a settling chamber respectively.

8. A device of the character described comprising a tank having a vertical partition terminating short of the bottom of said tank and forming a space at the side of the tank which is open to the main portion thereof below said partition, a perforated partition extending across said side space, and a horizontally disposed flow inlet pipe in said side space above said partition and having a closed end and a lateral discharge whereby said flow is directed vertically through said partition and into the main portion of the tank without impingement of said flow against the walls of the tank, the upper and lower parts of the main portion of the tank forming a gas chamber and a settling chamber respectively.

In testimony whereof I have affixed my signature to this specification.

DAVID G. LORRAINE.